(12) United States Patent
Pfann et al.

(10) Patent No.: US 6,321,883 B1
(45) Date of Patent: Nov. 27, 2001

(54) ELECTROMAGNETICALLY ACTUATED BRAKE

(75) Inventors: Jochen Pfann, Sternenfels; Günter Becker, Östringen; Horst Fischer, Ubstadt-Weiher, all of (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 0 days.

(21) Appl. No.: 09/309,389

(22) Filed: May 10, 1999

(30) Foreign Application Priority Data

May 14, 1998 (DE) .............................. 198 21 729
Aug. 25, 1998 (DE) .............................. 198 38 658

(51) Int. Cl.$^7$ ..................................... B60L 7/00
(52) U.S. Cl. .................. 188/161; 188/171; 188/73.37; 310/51
(58) Field of Search ..................... 188/171, 161, 188/162, 71.8, 72.2, 216, 72.1, 72.3, 73.35, 73.36, 73.37, 250 E; 310/103, 93, 77, 51; 192/30 V, 84.95

(56) References Cited

U.S. PATENT DOCUMENTS

| | | | |
|---|---|---|---|
| 3,665,231 | * 5/1972 | Wendler | 188/171 |
| 4,846,312 | * 7/1989 | Sweetmore et al. | 188/73.37 |
| 5,154,261 | * 10/1992 | Tanaka et al. | 188/171 |
| 5,274,290 | * 12/1993 | Fischer | 188/161 |
| 5,372,228 | * 12/1994 | VanLaningham et al. | 192/84 C |
| 5,739,610 | * 4/1998 | Nemoto et al. | 188/161 |
| 6,105,736 | * 8/2000 | Akita et al. | 188/73.37 |

FOREIGN PATENT DOCUMENTS

| | | |
|---|---|---|
| 28 53 802 A1 | 7/1980 | (DE) . |
| G 8913767.1 | * 2/1991 | (DE) . |
| 41 26 672 A1 | 2/1993 | (DE) . |
| 196 22 983 C1 | 11/1997 | (DE) . |
| 196 46 493 A1 | 5/1998 | (DE) . |

* cited by examiner

*Primary Examiner*—Douglas C. Butler
*Assistant Examiner*—Mariano Sy
(74) *Attorney, Agent, or Firm*—Westman, Champlin & Kelly, P.A.

(57) ABSTRACT

An electromagnetically actuated brake is provided comprising a magnetic body, which can energized electromagnetically to produce a magnetic force, and a brake rotor which is mounted on a shaft, in particular the drive shaft of an electric motor, in a rotationally stable manner, so that the shaft can be braked. A spring-loaded armature plate is mounted on the shaft and is movable axially parallel to the long axis of the shaft by the magnetic force produced in the magnetic body against the force of its spring loading whereby in a braked state the armature plate is apposed to the braking surface of the brake rotor. Disposed between the armature plate and the magnetic body or between the armature plate and the brake rotor are first and second dampers to attenuate oscillations of the brake. The first and second damper are located adjacent one another in the axial direction of the shaft and each comprises a material different from that of the other.

18 Claims, 3 Drawing Sheets

ELECTROMAGNETICALLY ACTUATED BRAKE

FIELD OF THE INVENTION

The present invention relates to an electromagnetically actuated brake, in particular for an electric motor. The invention further relates to the combination of an electric motor with such a brake, wherein a rotor of the brake is mounted in a rotationally stable manner on a drive shaft of the electric motor.

DESCRIPTION OF THE PRIOR ART

In a brake of the kind mentioned above, an armature plate is provided which can be moved axially in the long direction of the axis of rotation of the shaft, so that the armature plate is movable by a magnetic force produced by an electromagnet against the force of a spring loading. In the opposite direction the armature plate can be moved by the spring force. Thus by energizing or de-energizing the electromagnet the brake can be actuated in such a way that it is either applied or raised.

In particularly common use are brakes of this kind in which at least one compression spring is integrated into a magnetic body of the electromagnet, the force of which presses the armature plate against the brake rotor when the electromagnet is or becomes de-energized. While the electromagnet is energized, a magnetic force is generated that raises the armature disk away from the brake rotor against the spring loading so that the brake rotor and such rotatable parts as may be connected thereto can rotate about the axis of rotation.

In modern production lines drive mechanisms are often used that employ electric motors with such brakes. The processes of switching the brakes off and on, i.e. of energizing and de-energizing, and of maintaining an energized state contribute to sound generation just as does the operation of the electric motors. In particular with respect to regulations specifying certain upper limits for sound levels in the workplace, it is becoming increasingly important for brakes not to generate much noise during operation.

In the electromagnetically actuated brakes both direct-current and alternating-current electromagnets are known. To energize an electromagnet by direct current, the current is customarily produced by rectification of an alternating current. In the simplest case a diode is used for this purpose, so that a pulsating direct current is generated. This pulsating current can be smoothed with additional electronic circuitry. However, such circuits are usually expensive. When the magnet is kept energized for long periods, in particular when the brake is raised so that an armature plate is apposed to the magnetic body, the pulsating direct current can set the armature plate into vibration. As a result, resonant oscillations can be induced. The armature plate itself can be a component of the resonantly oscillating system.

Given that the nominal voltages of a.c. mains supplies vary throughout the world, designs are being sought by means of which one and the same electromagnet can generate a predetermined magnetic force, as independently as possible from the nominal voltage. Electronic circuits used for this purpose, by way of which the brake is connected to an a.c. mains supply, should be of the simplest possible construction. In particular, such circuits can employ an electronic switch in the form of a semiconductor switch. This switch in some circumstances turns the excitation current to the electromagnet on and off at a frequency higher than the mains frequency. The pulsating current thus generated can set the armature plate into vibration, in particular when it is raised and apposed to the magnetic body. Because the pulsating excitation current in general comprises a plurality of high frequencies, the initiation of undesired oscillations in the brake or its components results.

The stationary parts of the brake can with relatively little effort be so arranged that substantially no interfering oscillations are generated by a direct action on the stationary components.

Even an excitation current pulsating at high frequency can be smoothed by means of an electronic circuit. However, this electronic circuit necessarily occupies a relatively large volume, which is inconsistent with the desired miniaturization and compact construction of brakes of this generic kind.

Another approach to solving the problem is to reduce the pulsation of the current by employing a regulatory circuit. For example, such a circuit can operate according to the pulse-width modulation procedure. However, circuits of this kind are relatively elaborate and expensive; moreover, they can cause the electronic switch to turn on and off very often, which in turn generates high frequencies. Moreover, frequent switching increases the switching losses of the electronic switch, and therefore care must be taken to dissipate the heat adequately. Because of the high degree of integration of modern brakes of this generic kind, the solution of the heat-dissipation problem is made more difficult.

The axially movable armature plate plus the electromagnet and the spring element together constitute a system capable of oscillation, and the possibility that it will be set into undesired oscillation cannot be altogether excluded. In particular, it can be stimulated to oscillate by magnetostriction.

A means of noise attenuation when a brake of this generic kind is applied, i.e. when the armature plate strikes against the brake rotor, has been disclosed in the German patent DE 28 53 802 A1, namely to vulcanize a layer of rubber onto the brake rotor. When the brake is being raised or is kept in the raised state, however, this measure has no attenuating effect.

As another means of noise attentuation, in this case during the process of raising the brake, from DE 41 26 672 C2 a damping disk is known, which is disposed between the armature plate and the magnetic body in order to lessen the sound produced when the moving armature plate makes contact. The damping disk is made of sheet metal and comprises a plurality of elevations that are elastically deformed when struck by the armature plate. However, when the brake is permanently in the raised state, the armature disk does not rest against the damping disk over its entire area, so that the system composed of armature plate and damping disk is additionally susceptible to being set into oscillation. These oscillations can in particular be transmitted to other components of the brake.

SUMMARY OF THE INVENTION

It is an object of the present invention to provide a brake of the kind cited above in which vibrations of the armature plate, initiated by various mechanisms, are damped. In a further development of the invention the induction of vibrations caused by impact of the armature disk against the magnetic body while the brake is being raised can be mitigated.

According to the present invention there is provided an electromagnetically actuated brake comprising a shaft rotatable about its long axis; a brake rotor mounted on the shaft in a rotationally stable manner and comprising a braking surface by means of which the shaft can be braked; a magnetic body which can energized electromagnetically to produce a magnetic force; a spring-loaded armature plate which is mounted on the shaft and is movable axially parallel to the long axis of the shaft by the magnetic force produced in the magnetic body against the force of its spring loading whereby in a braked state the armature plate is apposed to the braking surface of the brake rotor; a first damping means which is located between the armature plate and at least one of the magnetic body and the brake rotor to attenuate oscillations of the brake; and a second damping means which is located adjacent the first damping means in the axial direction of the shaft and which comprises a material different from that of the first damping means.

When the damping means are located between the armature plate and the magnetic body not only do they attenuate the transmission of oscillations and/or impacts from the armature plate to the magnetic body and conversely, but also attenuate an initiation of oscillations in the armature plate. In addition, as the damping means are made of different materials and contact one another over their entire areas, many advantages for the damping mechanism result. First, oscillations at particular frequencies can be especially well attenuated by specific materials. By the provision of two different damping materials, therefore, oscillations can be effectively damped over a larger spectrum of frequencies. Furthermore, the full-area transition from one material to another material in itself has an oscillation-damping action. At such a transition between materials phonons in particular can be reflected or broken, so that only an attenuated transmission of the oscillation and/or the impact occurs across the boundary. This effect can be especially enhanced when the individual materials of the first and/or the second damping means comprise a composite material consisting of a plurality of different individual materials. It is preferred, for example, to use a fibrous material in combination with another material component. Woven and fleecy materials have proved to be especially advantageous for damping. In woven textiles and fleeces multiple transitions between materials occur during the propagation of oscillations, and the propagation of oscillations in directions transverse to the long direction of fibers is associated with a particularly strong attenuation. With such materials, therefore a large damping effect can be achieved even when the thickness of the material is slight.

Advantageously, at least the second damping means is made of a material, in particular a flexible material, that is attached to a carrier. The carrier is preferably the first damping means, the magnetic body or the armature plate. The second damping means may comprise a resilient material and in particular an elastomer, a rubber and/or a plastics material with elastic properties. The second damping means may also comprise a coating applied to the carrier and made of a substantially homogeneous material, in particular a lacquer or plastics coating of the carrier. In an especially preferred embodiment, the second damping means is adhered to the carrier.

Preferably, the magnetic body can be energized electromagnetically by a direct current. In this case the damping between the armature plate and the magnetic body when the brake is raised is especially effective. In many cases it is then possible to omit all smoothing of a pulsating direct current that has been generated from an alternating current.

The first damping means preferably comprises a solid material with good load-bearing properties. In this case the first damping means can then function as a carrier for the second damping means. An additional advantage of using such a material for the first damping means is that when it is combined with a second damping means made of a flexible, compressible and/or fiber-containing material, the combination of two materials with significantly different matter constants can effectively damp oscillations in a broad frequency spectrum.

Preferably the first damping means is made of sheet metal, in particular having a thickness in the range of 0.1 mm to 0.3 mm inclusive.

It is preferable for the first damping means to be clamped to the armature plate by means of a series of tabs defined around its edge that can clamp the armature plate. Such clamping is an especially simple solution to the problem of attachment of the first damping means. To produce this kind of attachment the first damping means, in particular one made of a sheet metal, is stamped out and radial incisions are made at its outer edges to form notches, so that between each two such notches one of a series of peripheral tabs is produced. The peripheral tabs of the stamped-out piece are then bent over to form claws that grip the armature plate.

The second damping means may be disposed between the first damping means and the armature plate and/or between the first damping means and the magnetic body. In a further development, the first damping means, which comprises a carrier, bears on each of its two sides respectively in the axial direction another damping element; that is a second and a third damping means. In a special embodiment still more damping means are provided, which in particular are apposed to one another in layers.

The armature plate preferably comprises a dimensionally stable material with an axial thickness amounting to 5- to 20-fold, and preferably 5- to 10-fold, the axial thickness of the first damping means. In this case the required stable construction of the armature plate is ensured by this measure in itself. The first and/or the second damping means make no substantial contribution to the dimensionally stable character of the armature plate.

Preferably also, at least one guide element projects from the armature plate toward the magnetic body. The guide element extends into or through a corresponding guide aperture defined in the first or the first and the second damping means so that the damping means is or are guided during movement in the axial direction. This guidance prevents movement of the damping means in a radial direction and/or in an azimuthal direction. The or at least one guide element, which is preferably a bolt, enables the brake to be raised by hand, i.e. the armature plate to be removed from the brake rotor.

Various exemplary embodiments of the invention will now be described with reference to the accompanying drawings.

DESCRIPTION OF THE PREFERRED EMBODIMENTS

Figure 1:
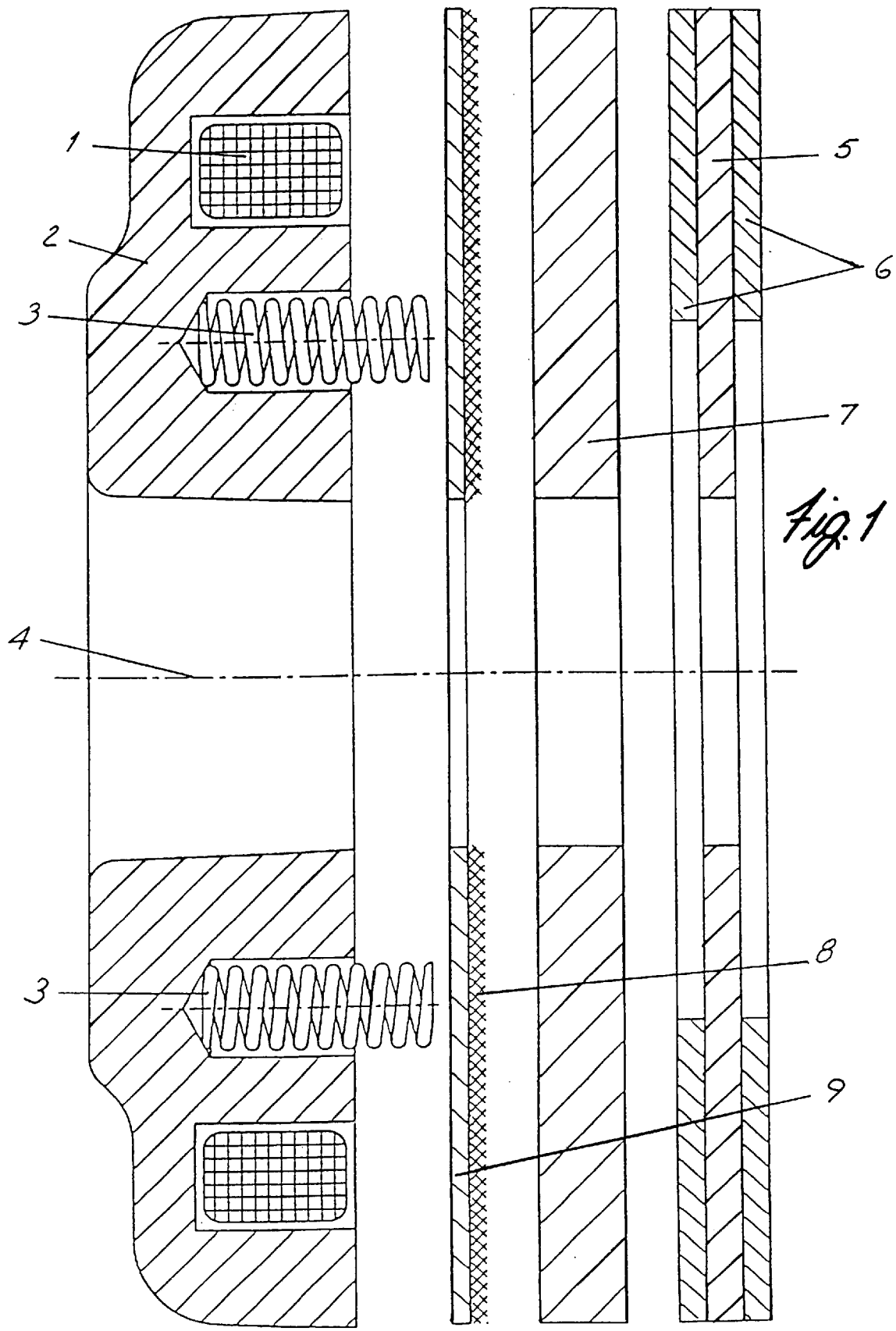
FIG. 1 is a schematic longitudinal axial section of a brake according to a first embodiment of the invention with a first damping means, an armature plate, and a resilient second damping means disposed between the first damping means and the armature plate.

FIG. 1 shows a first embodiment of a brake in accordance with the invention in a longitudinal axial section. The brake 10 is combined, for example, with an electric motor in order to be able to brake a drive shaft of said motor. In this case an axis of rotation 4 shown in FIG. 1 is the axis of rotation of the drive shaft of the motor. The brake 10 is then penetrated by the drive shaft, such that a brake rotor formed by a lining carrier 5 and two brake linings 6 disposed on opposite sides thereof in the axial direction is mounted on the drive shaft in a rotationally stable manner. A magnetic body, which comprises a brake coil 1 and a inductor core 2, is attached to a housing of the electric motor by bolts or screws (not shown) so that the magnetic body is substantially unable to rotate about the axis of rotation 4. In addition, an armature plate 7 and an annular piece of sheet steel 9, both of which are substantially rotationally symmetric, when the brake 10 is in the mounted state are guided in such a way that although they are axially movable, they are substantially unable to rotate about the axis of rotation 4. The steel sheet 9 comprises a first damping means to damp oscillations of the brake 10. On its side facing the armature plate 7 it bears an annular, substantially rotationally symmetric second, resilient or elastic damping means 8, which in an uncompressed state has substantially the same material thickness as the steel sheet 9.

The brake 10 further comprises compression springs 3, which generate the pressure required to apply the brake 10; that is, when the brake coil 1 is de-energized they press the armature plate 7 against the lining carrier or against its brake lining 6. Because of the braking pressure so exerted, the likewise axially movable brake rotor with the lining carrier 5 and the brake linings 6 is then pressed against a further frictional surface (not shown) of the electric motor.

In the first embodiment, when the brake 10 is raised, that is, when the brake coil 1 is energized, a magnetic force is exerted on the armature plate 7 and is sufficient to overcome the opposed pressure forces of the compression springs 3. The armature plate 7 is therefore pulled toward the inductor core 2, comes into contact over its entire surface with the second elastic damping means 8 and carries the elastic damping means 8 as well as the steel sheet 9 along with it until the steel sheet 9 is apposed to the inductor core 2 over substantially its entire area. The impact of the steel sheet 9 against the inductor core 2 is damped by the compression springs 3. In addition, the impact of the armature plate 7 and the steel sheet 9 as a whole is attenuated by the damping action of both the steel sheet 9 and the elastic damping means 8. In this process, the annular steel sheet 9 together with the elastic damping means 8 bends locally in the region of the compression springs 3 because of the increasing pressure against the compression springs 3 so that an additional damping action is achieved, which resembles the action of the elevations described above for a damping disk according to DE 41 26 672 C2. However, in comparison to the damping disk described there, the construction presented here offers the advantage that the steel sheet 9 comes to rest as far as possible over substantially its entire surface against the inductor core when the brake-raising process is complete. When the brake 10 is raised for long periods, therefore, oscillations are not initiated, owing entirely to the presence of only locally axial, elastic material transitions between the armature plate and the magnetic body.

In this embodiment, when a pulsating direct current is used to energize the brake coil 1 during a prolonged period with the brake in the lifted state, and this current is set to the lowest mean level possible in order to achieve the most effective and economical design of the brake 10, an initiation of oscillations of the armature plate 7 is effectively prevented, or at most only slight oscillations are initiated. This also happens during the process of raising the brake, when oscillation energy is dissipated within the individual damping elements, that is in the steel sheet 9 and in the elastic damping means 8, as well as at the material transitions between the magnetic body and the first damping means 9, between the damping means 8 and 9 themselves and between the damping means 9 aid the armature plate 7. Oscillation energy of all kinds, for example that of longitudinal oscillations, transverse oscillations, center-of-mass oscillations and surface oscillations, is dissipated by the damping mechanisms described here or not transmitted between the magnetic body and the armature plate 7.

The further embodiments shown in FIG. 2 to FIG. 5 exhibit substantially the same damping characteristics and advantages as the first embodiment. In the following, the differences are discussed.

Figure 2:
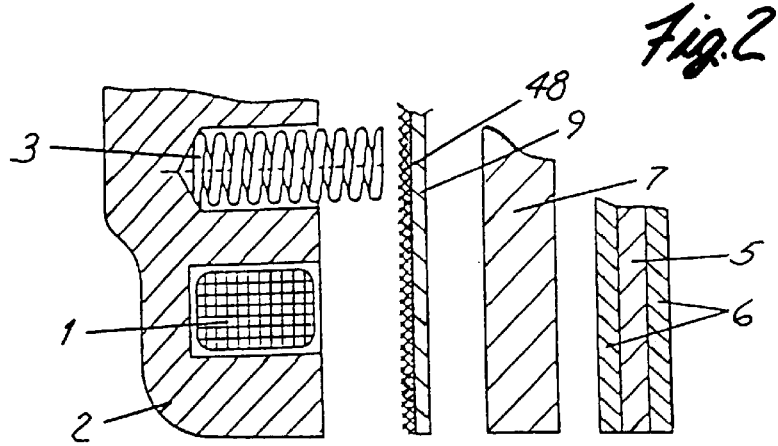
FIG. 2 is a partial sectional view similar to FIG. 1 showing second embodiment wherein a layer of lacquer is disposed as a second damping means between the first damping means and a magnetic body of the brake.

In the second embodiment as shown in FIG. 2, there is disposed on the steel sheet 9, on its side toward the magnetic body, a coating of lacquer 48 that serves as a second damping means. While still workable, the lacquer that forms the layer 48 adheres well to metal, in particular to steel, so that no additional adhesives are needed. In its dry state the layer of lacquer 48 is preferably resiliently deformable, but does not adhere to the inductor core 2.

Figure 3:
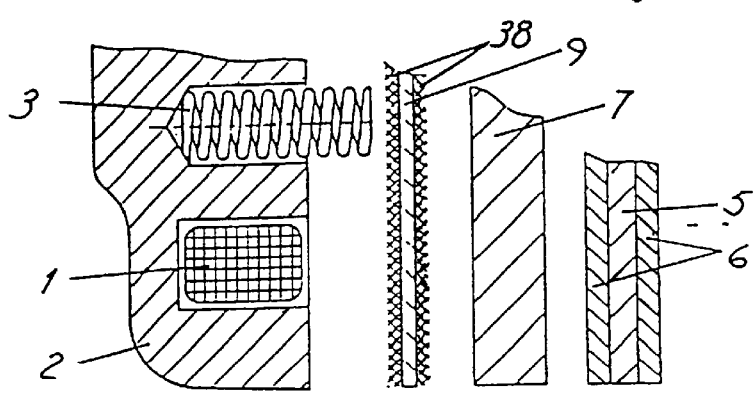
FIG. 3 is a view similar to FIG. 2 but of a third embodiment wherein a first damping means is constructed as a carrier, which is overlaid on each of its two sides in an axial direction with additional, second and third damping means.

In the third embodiment shown in FIG. 3, rubber elements 38 are attached on each of the two sides in the axial direction of the steel sheet 9, which comprises a first damping means and is constructed as a carrier for the elements 38. The rubber elements 38 comprise second and a third damping means. Preferably, the rubber elements 38 are made of different rubbers, the element 38 disposed on the left side of the steel sheet 9 being made of a material that can resist higher local pressure loads and frictional forces without damage than the element disposed on the right of the sheet 9, with respect to FIG. 3. This is because the left rubber element 38 is exposed to local pressure and frictional forces exerted by the compression springs 3. The left rubber element 38 therefore preferably comprises a hard rubber and the right rubber element 38, a softer rubber.

Figure 4:
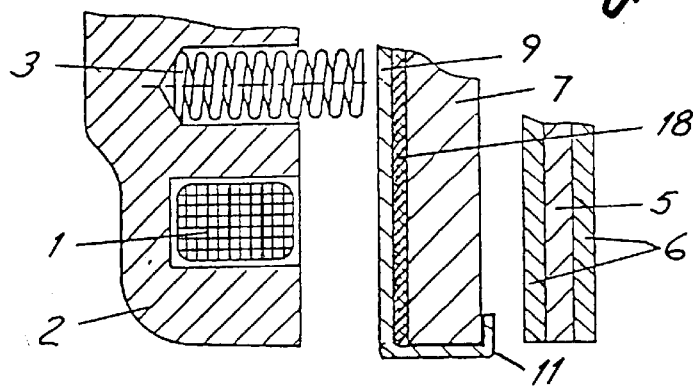
FIG. 4 is a view similar to FIG. 2 but of a fourth embodiment wherein a first damping means is clamped to the armature plate.

In the fourth embodiment shown in FIG. 4, the steel sheet 9 grips the outer circumference of the armature plate 7 at certain places with structures formed by bending peripheral tab-like regions of the steel sheet 9, so that they serve as claws 11. In FIG. 4 only one of the claws 11 is visible because this drawing shows only part of a longitudinal axial section.

Between the steel sheet 9 and the armature plate 7 an adhesive layer 18 is applied as second damping means, so that an additional adhesive connection between the steel sheet 9 and/or the armature plate 7 is produced, preferably on both axial sides thereof. Preferably, the adhesive layer 18 is tough and plastically deformable so that impact or oscillation energy is particularly well dissipated. Because of the adhesive action on the steel sheet 9 and/or the armature plate 7, the adhesive layer 18 is at least to a great extent kept in shape, which is that of an annular disk extending uninterrupted in the circumferential direction around the axis of rotation 4 (see FIG. 1).

Figure 5:
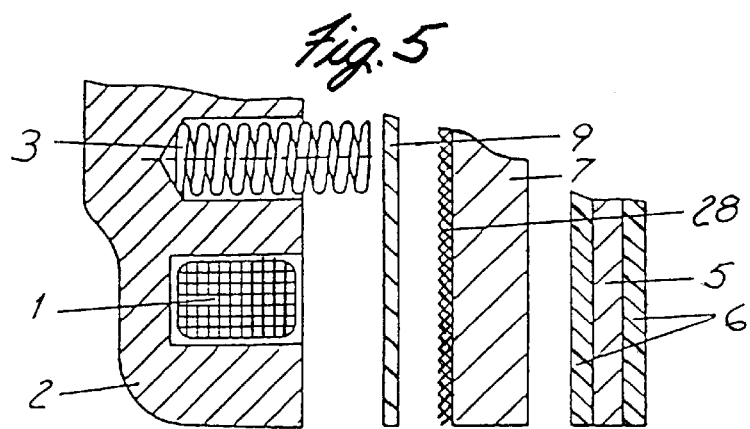
FIG. 5 is a view similar to FIG. 2 but of a fifth embodiment wherein a second damping means is constructed as a band of adhesive woven textile.

In the fifth embodiment shown in FIG. 5, which is an especially preferred embodiment, a woven textile adhesive band 28 is attached to the armature plate 7. Alternatively or in addition to the textile adhesive band 28, a band of woven glass fiber is used, which is adhered to the armature plate 7 by a thermally stable adhesive. Alternatively or in addition, bands of woven mineral fiber and/or adhesive bands without textile and/or elastomers and/or plastics can be used. This applies not only to the disposition of the second damping means on the armature plate 7 shown in FIG. 5, but also to other arrangements, in particular those shown in FIG. 1 to FIG. 4.

Figure 6:
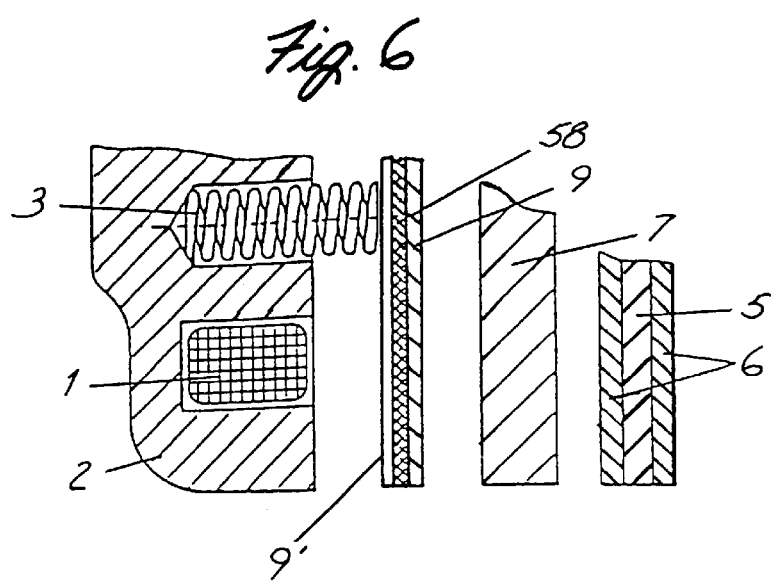
FIG. 6 is a view similar to FIG. 2 but of a sixth embodiment comprising a damping means of a three-layered construction.

In the sixth embodiment shown in FIG. 6, the damping means comprises a first metal, preferably steel, disk 9 and a second metal, preferably steel, disk 9', which are connected to one another by a plastics layer 58. The plastics layer 58 preferably comprises a viscoelastic plastic with adhesive properties. The metal disks 9, 9' preferably have a thickness in the range 0.5 to 1.5 mm inclusive, and the plastics layer 58 has a thickness of 0.05 mm.

The entire arrangement can be attached to the armature plate either detachably or by permanent connections employing adhesive, screws or welding.

Figure 7:
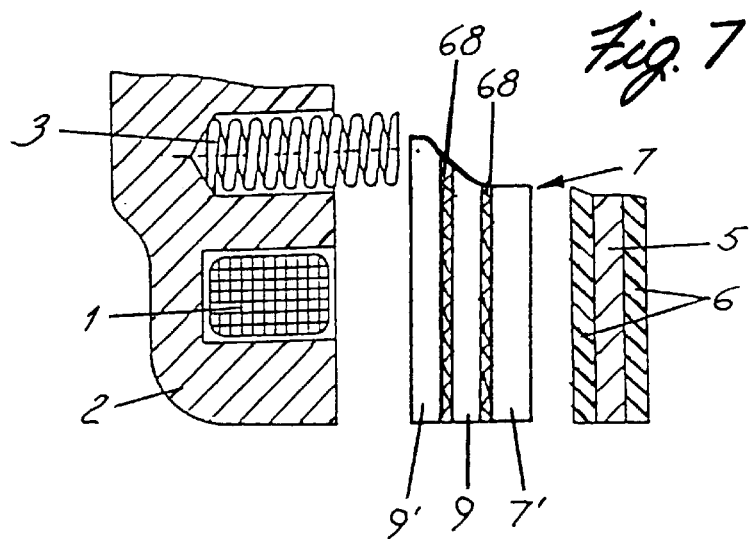
FIG. 7 is a view similar to FIG. 2 but of a seventh embodiment, in which the armature plate is connected to a damping means.

In the seventh embodiment shown in FIG. 7, the armature plate 7 has a laminated construction, in which metal plates 9, 9' and 7' are separated by plastics layers 68. The plastics layers are again very thin (ca. 0.05 mm), while the metal plates are relatively thick, in the exemplary embodiment shown here ca. 1.5 mm thick.

As can be discerned from the above embodiments, in an electromagnetically actuated brake according to the present invention at least two damping means are provided, each of which operates in a different way.

The first damping means combines two modes of operation: first, it serves as an elastic damping device, and second, it serves as a carrier for the second damping means. Thus it is not simply a matter of putting materials one behind another. Surface waves on the first damping means, in particular if they are of high frequency, are damped or absorbed by the second damping means. The thickness of the damping means is preferably made very small, in order not to enlarge the air gap between the armature plate and the magnetic body unnecessarily.

Furthermore, it is preferable to make the second damping means "sticky". That is, a plastic layer is rolled onto the metal layer(s) and thereby attached. The plastic layer thus has self-adhering properties. Alternatively, it is possible to use a coated sticky film.

A damping means in accordance with the invention can also be installed between the armature plate and the lining carrier, which provides further advantages.

Depending on the construction of the brake, in choosing a site for installation of the second damping means one of the main considerations is that the second damping means, at least in the embodiments described here, being made of less durable material, is subjected to more wear and tear than the first damping means, which is usually made of steel. The second damping means should therefore be disposed at a site as accessible as possible for maintenance purposes.

A description of the overall structure of the brake combined with an electric motor is beyond the scope of the present invention but a possible construction, which differs only with respect to the presence of the damping means, is described for example in DE 41 26 672 C2.

What is claimed is:

1. An electromagnetically actuated brake in an electric motor comprising:

a shaft rotatable about its long axis;

a brake rotor mounted on the shaft in a rotationally stable manner and comprising a braking surface by means of which the shaft can be braked;

a magnetic body which can be energized electromagnetically to produce a magnetic force;

a spring-loaded armature plate which is mounted on the shaft and is movable axially parallel to the long axis of the shaft by the magnetic force produced in the magnetic body against the force of its spring-loading whereby in a braked state the armature plate is apposed to the braking surface of the brake rotor;

at least one compression spring to generate the spring-loading of the armature plate whereby when the magnetic body is de-energized, the armature plate is pressed against the brake rotor by the spring-loading;

and for damping oscillations during change from said braked state to a non-braked state and during said non-braked state when the magnetic force is produced, further comprising a first damping means made of a solid material with a high load-bearing capacity which is located between the armature plate and the magnetic body;

and a second damping means which is attached to the first damping means in the axial direction of the shaft and which comprises a flexible material; and wherein said first and second damping means are provided for coming into contact over substantially its entire area with said magnetic body and said armature plate during said non-braked state, and wherein said first and second damping means are not attached to and separate from said armature plate.

2. A brake as claimed in claim 1, wherein the first damping means comprises a sheet metal.

3. A brake as claimed in claim 1, wherein the first damping means comprises sheet steel with a thickness in the range 0.1 mm to 0.3 mm inclusive.

4. A brake as claimed in claim 1, wherein the first damping means defines a series of tabs around its periphery which form claws that grip the outer circumference of the armature plate and by means of which the first damping means is clamped to the armature plate.

5. A brake as claimed in claim 1, wherein the second damping means comprises a flexible material which is attached to a carrier configured to carry second damping means.

6. A brake as claimed in claim 5, wherein the second damping means comprises a fiber-containing material.

7. A brake as claimed in claim 5, wherein the second damping means comprises a fiber-containing material in the form of at least one of a woven textile and a fleece.

8. A brake as claimed in claim 5, wherein the second damping means comprises a resilient material.

9. A brake as claimed in claim 5, wherein the second damping means comprises a resilient material in the form of at least one of an elastomer, a rubber, and a plastics material with elastic properties.

10. A brake as claimed in claim 5, wherein the second damping means comprises a coating on the carrier, which coating comprises a substantially homogeneous material.

11. A brake as claimed in claim 5, wherein the second damping means comprises a coating on the carrier, which coating comprises a lacquer or a plastics material.

12. A brake as claimed in claim 5, wherein the second damping means is adhered to the carrier.

13. A brake as claimed in claim 1, comprising a third damping means, which is located between the armature plate and the magnetic body, the first and second damping means also being located between the armature plate and the magnetic body such that the first to third damping means are disposed one behind another in the axial direction of the shaft.

14. A brake as claimed in claim 13, wherein the first damping means comprises a carrier for the second and third damping means, which are respectively attached to two sides of the first damping means in the axial direction of the shaft.

15. A brake as claimed in claim 1, wherein the armature plate comprises a dimensionally stable material which has an axial thickness amounting to 5- to 20-fold the axial thickness of the first damping means.

16. A brake as claimed in claim 1, wherein the magnetic body is energized electromagnetically by a direct current.

17. A brake as claimed in claim 1, comprising a guide means which projects from the armature plate toward the magnetic body and which extends into a corresponding guide aperture defined by at least the first damping means in order that the first damping means is guided when moved axially along the shaft.

18. An electric motor with an electromagnetically actuated brake as claimed in claim 1, comprising a housing, and wherein the shaft comprises a drive shaft of the electric motor and the magnetic body, the armature plate and the first and second damping means are attached to the housing such that they are substantially prevented from rotating about the axis of rotation of the drive shaft.

* * * * *

UNITED STATES PATENT AND TRADEMARK OFFICE
CERTIFICATE OF CORRECTION

PATENT NO. : 6,321,883 B1
DATED : November 27, 2001
INVENTOR(S) : Pfann et al.

Page 1 of 1

It is certified that error appears in the above-identified patent and that said Letters Patent is hereby corrected as shown below:

<u>Title page,</u>
Item [57], ABSTRACT,
Line 15, replace "damper" with -- dampers --.

Signed and Sealed this

Twenty-third Day of April, 2002

Attest:

Attesting Officer

JAMES E. ROGAN
*Director of the United States Patent and Trademark Office*